(12) United States Patent
Timmons et al.

(10) Patent No.: US 8,066,572 B1
(45) Date of Patent: Nov. 29, 2011

(54) SYSTEM FOR TRANSMITTING REAL-TIME GAME INFORMATION FOR A GAME TO A REMOTE DEVICE

(75) Inventors: Anthony Timmons, Fort Davis, TX (US); Daryl Burttschell, San Marcos, TX (US); Howard Burttschell, New Braunfels, TX (US)

(73) Assignee: Scores Two Go, LLC, Fort Davis, TX (US)

( * ) Notice: Subject to any disclaimer, the term of this patent is extended or adjusted under 35 U.S.C. 154(b) by 0 days.

(21) Appl. No.: 12/869,499

(22) Filed: Aug. 26, 2010

(51) Int. Cl.
*A63F 9/24* (2006.01)
(52) U.S. Cl. ............... 463/42; 463/16; 463/20; 463/40; 273/239; 273/277
(58) Field of Classification Search .................... 463/16, 463/20, 40, 42; 273/239, 277
See application file for complete search history.

(56) References Cited

U.S. PATENT DOCUMENTS

| | | | | |
|---|---|---|---|---|
| 7,460,863 | B2* | 12/2008 | Steelberg et al. | 455/419 |
| 2007/0091815 | A1* | 4/2007 | Tinnakornsrisuphap et al. | 370/252 |
| 2007/0243928 | A1* | 10/2007 | Iddings | 463/26 |
| 2008/0146344 | A1* | 6/2008 | Rowe et al. | 463/42 |
| 2009/0005146 | A9* | 1/2009 | Kelly et al. | 463/16 |
| 2009/0163272 | A1* | 6/2009 | Baker et al. | 463/29 |
| 2010/0248817 | A1* | 9/2010 | Anderson | 463/25 |

* cited by examiner

*Primary Examiner* — Pierre Eddy Elisca
*Assistant Examiner* — Shahid Kamal
(74) *Attorney, Agent, or Firm* — Buskop Law Group, PC; Wendy Buskop

(57) ABSTRACT

One or more systems for transmitting real-time game information for a game to a remote device are provided. The system can include at least one remote terminal unit adapted to be communicated with a controller associated with a game information display device. The remote terminal unit can communicate with a network in communication with each remote terminal unit and with a game server. The game server can include a game server processor. The game server processor can be in communication with each remote terminal unit. A game server data storage can be in communication with the game server processor.

17 Claims, 5 Drawing Sheets

FIGURE 2A

| GAME SERVER DATA STORAGE | 28 |
|---|---|
| COMPUTER INSTRUCTIONS FOR RECEIVING, STORING, AND TRANSMITTING SCORING INFORMATION | 205 |
| COMPUTER INSTRUCTIONS TO ACTIVATE AND DEACTIVATE ONE OR MORE REMOTE TERMINAL UNITS | 208 |
| COMPUTER INSTRUCTIONS TO CREATE AT LEAST ONE INDIVIDUAL ACCOUNT HAVING AT LEAST ONE CLIENT DEVICE IDENTIFIER | 210 |
| COMPUTER INSTRUCTIONS TO CREATE AT LEAST ONE FACILITY ACCOUNT ASSOCIATED WITH AT LEAST ONE REMOTE TERMINAL UNIT | 212 |
| COMPUTER INSTRUCTIONS TO ASSOCIATE THE INDIVIDUAL ACCOUNT WITH THE FACILITY ACCOUNT | 214 |
| COMPUTER INSTRUCTIONS FOR IDENTIFYING EACH CONTROLLER ASSOCIATED WITH EACH REMOTE TERMINAL UNIT ASSOCIATED WITH EACH FACILITY ACCOUNT | 217 |
| COMPUTER INSTRUCTIONS FOR DETERMINING EACH ACTIVITY USING EACH CONTROLLER ASSOCIATED WITH EACH REMOTE TERMINAL UNIT ASSOCIATED WITH EACH FACILITY ACCOUNT | 218 |
| COMPUTER INSTRUCTIONS TO ALLOW AN OWNER OF THE INDIVIDUAL ACCOUNT TO SELECT AT LEAST ONE ACTIVITY | 220 |
| COMPUTER INSTRUCTIONS TO IDENTIFY IF THE GAME INFORMATION DISPLAY DEVICE IS OPERATING PROPERLY | 224 |
| COMPUTER INSTRUCTIONS TO COMPILE PRESENT GAME INFORMATION DISPLAY DEVICE STATUS | 226 |
| COMPUTER INSTRUCTIONS TO CONFIGURE OR RECONFIGURE ONE OR MORE REMOTE TERMINAL UNITS ONLINE AND IN REAL-TIME | 228 |
| COMPUTER INSTRUCTIONS TO COMPILE A REPORT COMPRISING FAILURE INFORMATION | 230 |
| COMPUTER INSTRUCTIONS TO COLLECT REMOTE TERMINAL UNIT INFORMATION | 232 |
| COMPUTER INSTRUCTIONS TO CREATE ADVERTISER ACCOUNTS, SPONSORSHIP ACCOUNTS, OR COMBINATIONS THEREOF | 236 |
| COMPUTER INSTRUCTIONS TO CREATE A MEDIA ACCOUNT | 238 |
| COMPUTER INSTRUCTIONS TO TRANSMIT ADVERTISEMENTS, SPONSORSHIPS, OR COMBINATIONS THEREOF | 244 |

| | |
|---|---|
| COMPUTER INSTRUCTIONS TO CREATE A LIBRARY OF STORED IMAGES OF GAME INFORMATION DISPLAY DEVICES FOR TRANSMITTING THE STORED IMAGES TO THE CLIENT DEVICE | ~246 |
| COMPUTER INSTRUCTIONS TO CREATE A LIBRARY OF TEAM STATISTICS | ~248 |
| COMPUTER INSTRUCTIONS TO TRANSMIT VIDEO OF THE SCOREBOARD, VIDEO OF A GAME, AUDIO OF THE GAME, TEXT, RSSL FEEDS, OR COMBINATIONS THEREOF TO THE CLIENT DEVICE | ~250 |
| COMPUTER INSTRUCTIONS TO CREATE A LIBRARY OF PLAYER STATISTICS | ~252 |
| COMPUTER INSTRUCTIONS TO TRANSMIT PLAYER STATISTICS | ~254 |
| COMPUTER INSTRUCTIONS TO ALLOW ACCESS TO ONE OR MORE LIBRARIES ON THE DATA STORAGE | ~265 |
| COMPUTER INSTRUCTIONS TO ISSUE AN ALERT OF ACTIVATION OR DEACTIVATION OF ONE OR MORE REMOTE TERMINAL UNITS | ~267 |
| COMPUTER INSTRUCTIONS TO COMPARE GAME INFORMATION TO A PRESET LIMIT | ~270 |
| MOBILE DEVICE APPLICATION PACKAGE | ~275 |

*FIGURE 2B*

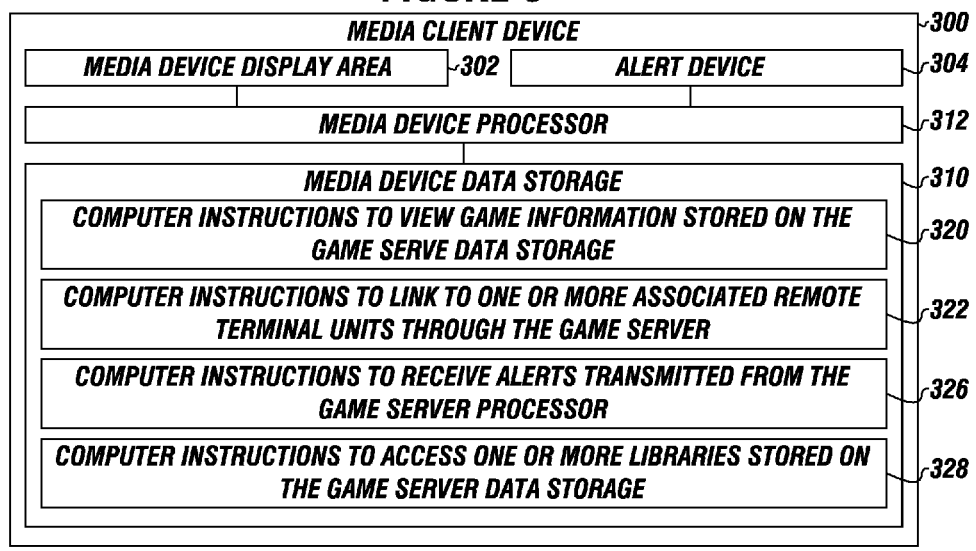
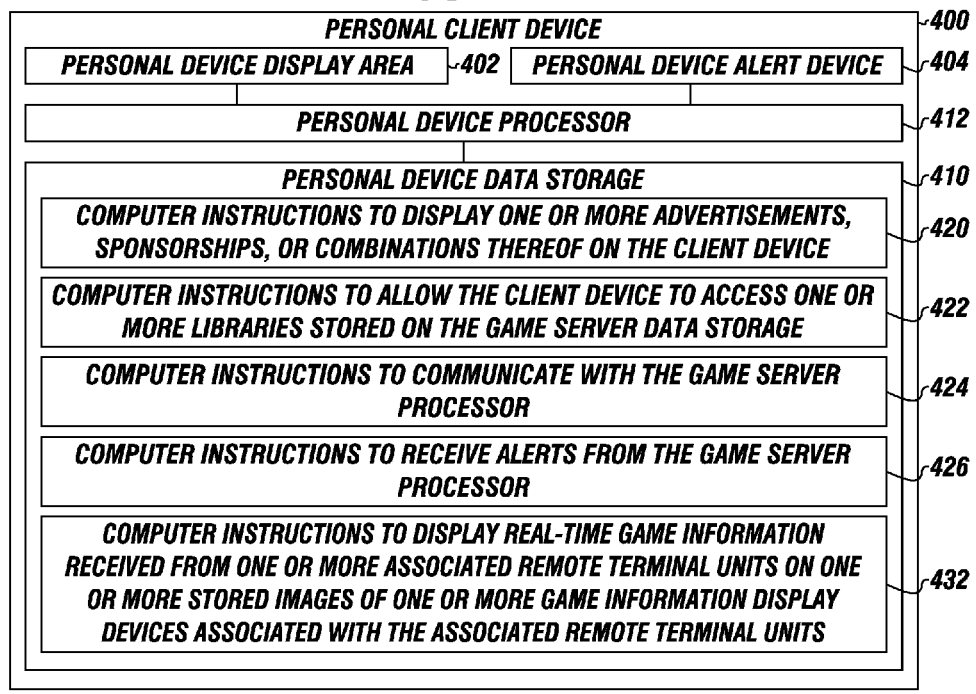

SYSTEM FOR TRANSMITTING REAL-TIME GAME INFORMATION FOR A GAME TO A REMOTE DEVICE

FIELD

The present embodiments generally relate to systems for transmitting real-time game information for a game to a remote device.

BACKGROUND

A need exists for a system for transmitting real-time game information to a remote device, such as a mobile phone.

A further need exists for a system that allows a user to pick what real-time game information the user wishes to receive on the user's mobile device.

The present embodiments meet these needs.

BRIEF DESCRIPTION OF THE DRAWINGS

The detailed description will be better understood in conjunction with the accompanying drawings as follows:

FIGS. 2A-2B depict an illustrative schematic of a game server data storage that can be used with the system according to one or more embodiments.

FIG. 3 depicts an illustrative schematic of a media client device usable with the system according to one or more embodiments.

FIG. 4 depicts an illustrative schematic of a personal client device usable with the system according to one or more embodiments.

Figure 1:
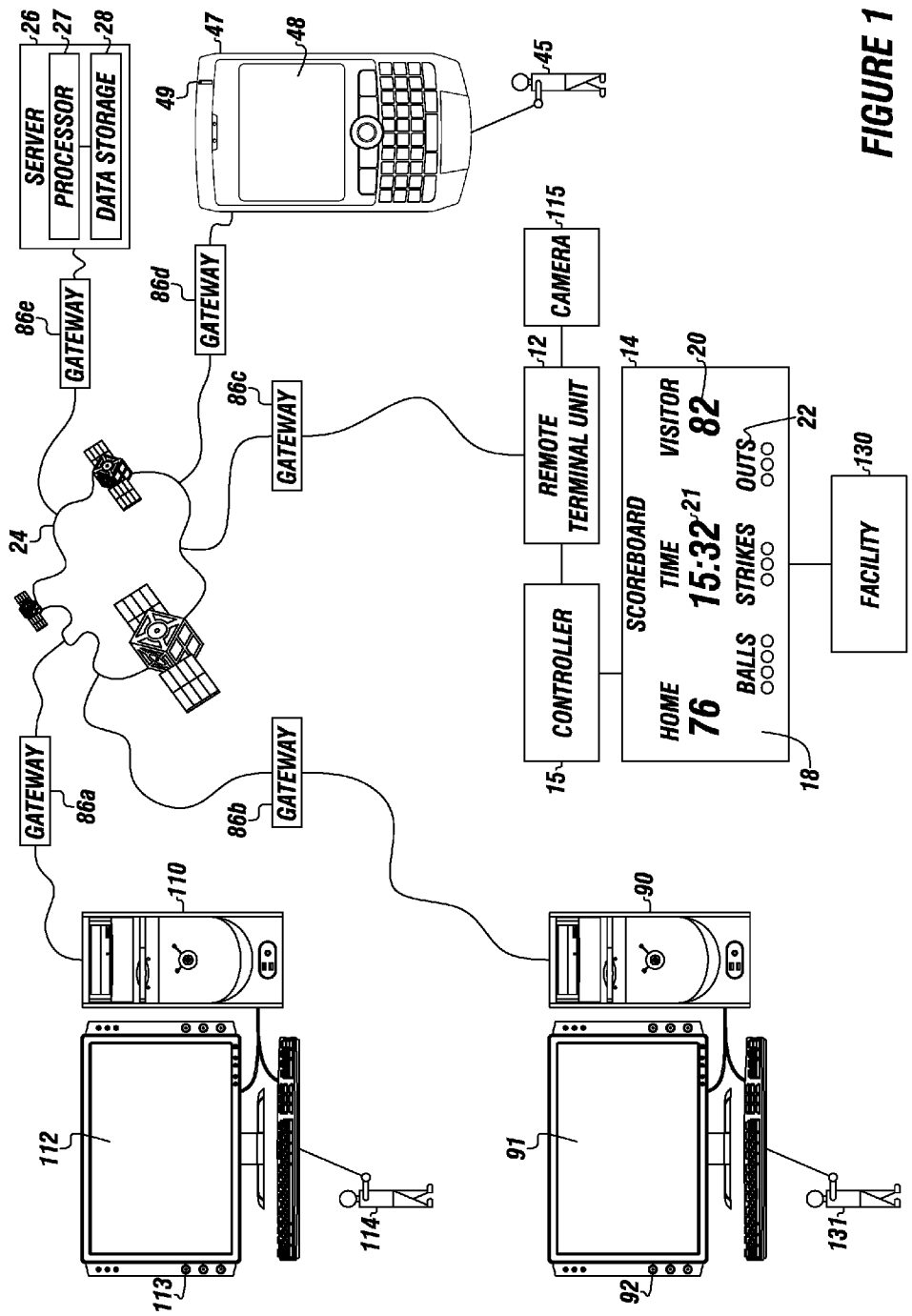
FIG. 1 depicts a schematic of an illustrative system according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to one or more systems for transmitting real-time game information for a game to a remote device.

An illustrative system for transmitting real-time game information for a game to a remote device can include a remote terminal unit that includes a transceiver. The real-time game information can be for one or more games, such as basketball.

In one or more embodiments, the remote terminal unit can be a transceiver configured to transmit data to one or more servers, one or more client devices, or a combination thereof.

In one or more embodiments, the remote terminal unit can include the transceiver, a remote terminal unit processor, a remote terminal unit data storage, a receiver, remote terminal unit computer instructions stored on the remote terminal unit data storage, or combinations thereof.

In one or more embodiments, the remote terminal unit can have a receiver in communication with a game server.

The game server can be adapted to perform a diagnostic test on a controller of the game information display device, on the game information display device, or both.

In one or more embodiments, the remote terminal unit can be removable and reattachable to the controller. In one or more embodiments, the remote terminal unit can be powered by the controller.

In one or more embodiments, the remote terminal unit can be adapted to transmit video of the game information display device, video of a game, audio of the game, text of the game, or an RSSL feed, or combinations thereof.

The remote terminal unit can be configured or adapted to communicate with a game information display device used with a game or other activity.

Illustrative games that the game information display device can be used with can include: soccer, football, basketball, baseball, volleyball, softball, ice hockey, wrestling, track and field, lacrosse, field hockey, bowling, ice skating, downhill skiing, shooting, cross country skiing, golf, swimming, diving, rugby, cricket, polo, boxing, fencing, mixed martial arts, martial arts, archery, auto racing, rodeo, horse racing, tennis, cycling, other games that have scores or statistics, or combinations thereof.

The game information display device can be a scoreboard, a score screen, another device used to display game information, or combinations thereof.

The game information can include scores and game statistics. For example, the game information can include any data or information related to the game being played.

Illustrative game information can include: fouls, points, batting averages, strikeouts, passing yards, rushing yards, shooting percentages, receiving yards, goals scored, shots on goal, saves, injury time, escapes, take downs, time remaining, game phase, team fouls, player names, rotation switches, wins, losses, saves, field goals, points allowed, yards per rush, total team fouls, total team penalties, yards per reception, tackles, sacks, interceptions, quarterback ratings, homeruns, runs batted in, stolen bases, earned run average, walks and hits per inning pitched, break points, player challenges, faults, first serve percentages, second serve percentages, on base percentages, slugging percentages, penalty minutes, position information, leader board information, lap time, heat or lane assignments, or combinations thereof.

The remote terminal unit can be configured to transmit data being displayed by the game information display device and the remote terminal unit can be in communication with a network. The network can be the Internet, a local network, a satellite network, a wired network, a wireless network, a fiber optic network or combinations thereof.

The network can also be in communication with the game server. The game server can include a game server processor, such as a Pentium™ processor. The game server processor can be in communication with a game server data storage. The game server data storage can be a virtual electronic storage medium, a flash drive, a disk, a hard drive, or combinations thereof.

The game server data storage can have a plurality of computer instructions stored thereon.

The computer instructions can include:

(i) computer instructions for receiving, storing, and transmitting real-time scoring information, for example, a basketball score including time, quarter, foul count, and team score can be received from the game server via the remote terminal unit, stored on the game server data storage, and transmitted to one or more client device via the network;

(ii) computer instructions to activate and deactivate the remote terminal unit, for example, a remote terminal unit can be turned on by the game server via the network using these computer instructions;

(iii) computer instructions to create at least one individual account having at least one client device identifier, for example, an individual account for Bill can be created on the game server data storage and a unique client device identifier can be stored in the individual account using these computer instructions;

(iv) computer instructions to create at least one facility account associated with at least one remote terminal unit, for example, an account for Texas Tech can be created and stored on the game server data storage using these computer instructions;

(v) computer instructions to associate the individual account with the facility account, for example, a drop down menu having one or more facility account can be presented to Bill, which allows Bill to associate his individual account with one of the facility accounts, using these computer instructions;

(vi) computer instructions for identifying the game information display device associated with each remote terminal unit at each facility, for example, these instructions can receive a game information device identification number, such as an alpha numeric code, from the remote terminal unit and match the game information device identification number to a pre-stored game information device identification number on the game server data storage;

(v) computer instructions for determining each activity using each game information display device, for example, the remote terminal unit can acquire a code from an associated controller that indicates what game is being played and can transmit the acquired code to the game server, wherein the code is associated with an activity, such as the Texas Tech Red Raiders playing basketball; and (vi) computer instructions to allow the individual account to select at least one activity, for example, these computer instructions can display a drop down list to the individual client device, wherein the drop down list has a plurality of games for the individual to select, such as basketball, football, volleyball, baseball, tennis, or similar sporting events.

The system is not solely for use with universities but can be used with horse tracks, commercial boxing, private leagues, professional sports, Olympic sports, or other activities that have ongoing scoring systems, such as professional golf.

In one or more embodiments, the game server data storage can also include computer instructions to identify if the game information display device is operating properly, such as the game information display device is on.

The system can also include computer instructions to compile a report comprising failure information, such as the controller for a game information display device failed to communicate with the remote terminal unit on a specific time and date.

The system can also include computer instructions to store an image of at least one game information display device and to transmit at least one stored image to the client device.

In one or more embodiments, the system can include computer instructions to display one or more advertisements on the client device. For example, these computer instructions can allow one or more advertisements stored on the game server data storage to be displayed on one or more client devices.

In one or more embodiments of the system, the game server, network, or both can be adapted to communicate with a client device. For example, the client device can be in communication with the network and the game server, and the client device can receive game information transmitted by the remote terminal unit via the game server and the network. The client device can be adapted to receive real-time game information transmitted from the remote terminal unit with less than ten seconds delay from the remote terminal unit to the client device, to receive stored information from the game server, or combinations thereof.

The client device can be a mobile communication device. For example, the mobile communication device can be a cell phone, a laptop computer, a personal computer, an Internet enabled mp3 player, an Internet enabled personal assistant device, another Internet enabled mobile device, a vehicle computer, iPad™, or combinations thereof.

In one or more embodiments, the game server can be in communication with a plurality of game information display devices, and the game server can be configured to simultaneously receive real-time game information from each controller associated with each of the game information display devices.

In one or more embodiments, the game server can communicate with one or more client devices, one or more game information display devices, or a combination thereof through a plurality of gateways in communication with the network. Each gateway can have the same industry standard protocol. In other embodiments, one or more of the gateways can have a different industry standard protocol. Illustrative gateway protocols include an SMTP gateway, a SIP, an H.323, an ISDN gateway, a PSTN gateway, a softswitch, or the like In one more embodiments, the remote terminal unit can have computer instructions stored on the remote terminal unit data storage. For example, the computer instructions can adapt the remote terminal unit to perform a diagnostic test on a controller of the game information display device, on the game information display device, or both.

In one or more embodiments, the system can include a camera in communication with the remote terminal unit. The camera can provide video and audio signals to the remote terminal unit, and the remote terminal unit can store the video and audio signals in a library of video and audio transmissions. The camera can be integrated with the game information display device, connected to the game information display device, mounted adjacent to the game information display device, or combinations thereof. The remote terminal unit can transmit acquired game information to the game server. The game server can transmit the game information to one or more client devices, can store the game information, or combinations thereof.

The game server data storage, the remote terminal unit data storage, or both can have: computer instructions to issue an alert of activation of at least one remote terminal unit; computer instructions to issue an alert of deactivation of at least one remote terminal unit; computer instructions to compare game information to a preset limit; computer instructions to issue an alert when the preset limit is exceeded or not achieved by the game information; or combinations thereof.

FIG. 1 depicts a schematic of an illustrative system according to one or more embodiments. The depicted system can include one or more networks 24, one or more game information display devices 14, here shown as a scoreboard; one or more controllers 15, one or more remote terminal units 12, one or more cameras 115, and one or more game servers, here shown as server 26.

The network 24, the server 26, or both can be configured to communicate with one or more personal client devices 47, one or more facility client devices 90, one or more media client devices 110, or combinations thereof.

For example, the server 26 can communicate with one or more of the client devices 47, 90, and 110 via the network 24. The network 24 can communicate with one or more of the client devices 47, 90, and 110 through a plurality of gateways, including gateway 86a, gateway 86b, gateway 86c, gateway 86d, and gateway 86e.

The network 24 can be the Internet, a local network, or another communication network. The network 24 can communicate with the remote terminal unit 12, the client devices 47, 90, and 110, the server 26, or combinations thereof using a form of telemetry. Illustrative telemetry can include: satellites, wired telemetry, wireless telemetry, the like, or combinations thereof.

The game information display device 14 can have a game information display area 18. The game information display area 18 can include a game statistics section 22, a time display section 21, a score display section 20, or combinations thereof.

The game statistics section 22 can display statistics for individual players of a game, one or more teams that are competing in the game, or a combination thereof. For example, the game information can include any data or information related to the game being played.

Illustrative game information can include: fouls, points, batting averages, strikeouts, passing yards, rushing yards, shooting percentages, receiving yards, goals scored, shots on goal, saves, injury time, escapes, take downs, time remaining, game phase, team fouls, players name, rotation switches, wins, losses, saves, field goals, points allowed, yards per rush, total team fouls, total team penalties, yards per reception, tackles, sacks, interceptions, quarterback rating, homeruns, runs batted in, stolen bases, batting average, earned run average, walks and hits per inning pitched, break points, player challenges, faults, first serve percentage, second serve percentage, on base percentage, slugging percentage, penalty minutes, position information, leader board information, lap time, heat or lane assignments, or combinations thereof. Any game statistics can be displayed in the game statistics section 22.

The time display section 21 can display the amount of time left in the game, a quarter of the game, a period of the game, a round of the game, or any other time information associated with the game being played.

The score display section 20 can display the score or place of each team playing the game, an individual playing the game, or combinations thereof. For example, the game information display device 14 can be used with a wrestling dual, and the score display section can indicate the score of a current match and the total team scores.

The controller 15 can be in communication with the game information display device 14. The controller 15 can be integrated with, adjacent to, or remote from the game information display device 14. The controller 15 can communicate with the game information display device 14 by using any form of telemetry. For example, the controller 15 can be in wired or wireless communication with the game information display device 14.

The remote terminal unit 12, which can be a transceiver, can be in communication with the controller 15, the network 24, the server 26, and the camera 115. More complex remote terminal units, such as other ones described herein, can be used with the system. The remote terminal unit 12 can be powered by the controller 15.

The server 26 can be or include a processor 27, also referred to herein as a game server processor. The server 26 can be or include a data storage 28, also referred to herein as a game server data storage. The data storage 28 is described in more detail below. The processor 27 can be a Pentium™ processor or another processor.

The personal client device 47 can have a display area 48 for displaying game information or other information to an individual or user 45. The personal client device 47 can also have one or more alert emitting devices 49, such as a speaker. The alert emitting device 49 can sound an alarm or make a specific sound upon certain events as described in more detail below. In one or more embodiments, the alert can be a visual alert, or a combination of a visual alert and audio alert. The visual alert can be viewed on the display area 48.

The facility client device 90 can have a display area 91 for displaying game information or other information to a facility 130 or to a representative of the facility 131. The facility client device 90 can also include or be in communication with a facility alert emitting device 92. The facility alert emitting device 92 can issue an alert to the facility 130 or to the representative of the facility 131 upon the occurrence of one or more events. The alert can be visual, such a message displayed on the a display area 91, an audio alert sounded on the alert emitting device 92, or combinations thereof.

The facility 130 can be a school, a league, a municipality, an administrator, association, conference, or another entity. The facility 130 can be associated with the game information display device 14.

The media client device 110 can include a display area 112 for displaying game information or other information to a media organization, news organization, or media person 114. The media client device 110 can also include a media alert emitting device 113 for issuing one or more alerts to the media organization, news organization, or media person 114 upon the occurrence of one or more events. The alert can be a visual alert displayed on the display area 112, an audio alert sounded on the media alert emitting device 113, or combinations thereof.

The camera 115 can communicate with the remote terminal unit 12. The camera 115 can be a video camera, a digital camera, an audio recorder, or combinations thereof. The camera 115 can capture video of the game, audio of the game, images of the game, or combinations thereof.

The captured video of the game, audio of the game, images of the game, or combinations thereof can be sent to the server 26; stored on the data storage 28; transmitted to one or more of the client devices 47, 90, and 110; or combinations thereof.

FIGS. 2A and 2B depict an illustrative schematic of a game server data storage 28 that can be used with the system.

The game server data storage 28 can include: computer instructions for receiving, storing, and transmitting scoring information 205; computer instructions to activate and deactivate one or more remote terminal units 208; computer instructions to create at least one individual account having at least one client device identifier 210; computer instructions to create at least one facility account associated with at least one remote terminal unit 212; computer instructions to associate the individual account with the facility account 214; computer instructions for identifying each controller associated with each remote terminal unit associated with each facility account 217; computer instructions for determining each activity using each controller associated with each remote terminal unit associated with each facility account 218; computer instructions to allow an owner of the individual account to select at least one activity 220; computer instructions to identify if the game information display device is operating properly 224; computer instructions to compile present game information display device status 226; computer instructions to configure or reconfigure one or more remote terminal units online and in real-time 228; computer instructions to compile a report comprising failure information 230; computer instructions to collect remote terminal unit information 232; computer instructions to create advertiser accounts, sponsorship accounts, or combinations thereof 236; computer instructions to create a media account 238; and computer instructions to transmit advertisements, sponsorships, or combinations thereof 244.

FIG. 2B depicts a continuation of FIG. 2A. The game server data storage 28 can include: computer instructions to create a library of stored images of game information display devices for transmitting the stored images to the client device 246; computer instructions to create a library of team statistics 248; computer instructions to transmit video of the scoreboard, video of a game, audio of the game, text, RSSL feeds, or combinations thereof to the client device 250; computer instructions to create a library of player statistics 252; computer instructions to transmit player statistics 254; computer instructions to allow access to one or more libraries on the data storage 265; computer instructions to issue an alert of activation or deactivation of one or more remote terminal units 267; computer instructions to compare game information to a preset limit 270; and a mobile device application package 275 that can be downloaded to one or more client devices.

The computer instructions for receiving, storing, and transmitting scoring information 205 can be used to instruct the processor to communication with the network to receive data transmitted from one or more remote terminal units, to store the received data in the game server data storage, and to transmit selected game information or other data to one or more client devices.

The computer instructions to activate and deactivate one or more remote terminal units 208 can instruct the processor to activate or deactivate one or more remote terminal units upon the occurrence of a specified event or at a scheduled time and day. For example, these computer instructions can be configured to activate one or more remote terminal unites when instructed to by a facility. In another illustrative example, these computer instructions can activate one or more remote terminal units based on a schedule specified by an associated facility.

The computer instructions to create at least one individual account having at least one client device identifier 210 can be used to instruct the processor to receive input from a user to create an individual account and to associate the individual account with one or more of the user's client devices. For example, these computer instructions can instruct the processor to allow a user to input personal information, such as name, address, interests, location, and the like; payment information, such as, credit card information, debit card information, bank account information, billing address, or other payment information; and client device identification information, such as an IP addresses, phone numbers, or other device identification information.

The computer instructions to create at least one facility account associated with at least one remote terminal unit 212 can allow a facility, such as a school, school district, league, municipality, conference, association, or other entity, to input: facility information, remote terminal unit information, schedules of games, administrators of the account, or similar information.

For example, a facility can identify itself as a school district and provide a schedule of all games or events that will have information displayed on a game information display device associated with the facility, such as a scoreboard at the facility's football field, and identification information, such as an ID code, serial number, or other identifying information of one or more remote terminal units associated with the game information display device associated with the facility.

The computer instructions to associate the individual account with the facility account 214 can allow a user to associate the user's account with a created facility account and to link the one or more client devices associated with the individual account to one or more remote terminal units associated with the facility account.

For example, a created facility account can have a first remote terminal unit associated with the facility account, and the first remote terminal unit can be associated with a first game. The created facility account can have a second remote terminal unit associated with the facility account and associated with a second game. Based on the users preference or a purchased package, the user can be linked to one of the remote terminal units or simultaneously to both of the remote terminal units through the game server. Accordingly, the client device can receive real-time game information from each of the linked remote terminal units. In addition, these computer instructions can record how many individuals are associated with a facility and can calculate a portion of proceeds from packages purchased by individual accounts associated with the facility account that goes to the associated facility.

The computer instructions for identifying each controller associated with each remote terminal unit associated with each facility account 217 can receive input from each facility that identifies each controller that is associated with one or more of the facility's remote terminal units that are associated with the facility account.

The computer instructions for determining each activity using each controller associated with each remote terminal unit associated with each facility account 218 can receive information from the associated facility that indicates what games are played on associated remote terminal units, or can receive signals from the associated remote terminal units that can indicate that a certain game was selected on a controller of the game information display device associated with the remote terminal unit.

The computer instructions to allow the individual account to select at least one activity 220 can present a list of activated remote terminal units and each activity using each game information display device associated with each activated remote terminal unit.

For example, if a facility associated with the individual account has a first remote terminal unit associated with a first game information game information display device and a second remote terminal unit associated with a second game information game information display device, and if a football game's game information is being displayed on the first game information display device and a soccer game's game information is being displayed on the second game information display device, the game server processor can indicate this on the user's client device. The user can then select if the user wants to view real-time game information from the first remote terminal unit, the second remote terminal unit, or both of the remote terminal units.

The computer instructions to identify if the game information display device is operating properly 224 can allow the processor to receive a signal from an associated remote terminal unit that indicates if a malfunction has occurred with the controller of an associated game information display device, or with the game information display device. As such, these computer instructions can allow the game server processor to perform a diagnostic test on the game controller or on the game information display device associated with one or more associated remote terminal units.

The computer instructions to compile present game information display device status 226 can instruct the processor to actively archive the activity of one or more associated remote terminal units.

The computer instructions to configure or reconfigure one or more remote terminal units online and in real-time 228 can instruct the processor to send data or instructions to the remote terminal unit to update data or other information stored on the remote terminal unit.

The computer instructions to compile a report comprising failure information 230 can instruct the processor to archive each time a malfunction is detected on one or more of the remote terminal units, on one or more game information display devices, on one or more associated controllers, or combinations thereof.

The computer instructions to collect remote terminal unit information 232 can instruct the processor to receive information related to one or more remote terminal units and to store the received information. Illustrative remote terminal unit information can include: status, number of ports, serial number, other identification information, or combinations thereof.

The computer instructions to create advertiser accounts, sponsorship accounts, or combinations thereof 236 can allow one or more companies to store advertisements or sponsorships in the game server data storage, and to pay to have the advertisements or sponsorships transmitted to client devices associated with individual accounts.

The computer instructions to create a media account 238 can allow a media organization, news organization, or media person to set up a media account that has access to game information stored on the game serve data storage.

The computer instructions to transmit advertisements, sponsorships, or combinations thereof 244 can be used to instruct the processor to send one or advertisements or sponsorships to one or more client devices associated with an individual account based on certain criteria. For example, a company or advertiser can pay to have one or more stored advertisements sent to: all client devices, client devices associated with an individual account associated with one or more specific facility accounts, client devices associated with individual accounts associated with a specific area, or combinations thereof.

The computer instructions to create a library of stored images of game information display devices for transmitting the stored images to the client device 246 can save received images of game information display devices associated with one or more remote terminal units.

The stored image of the game information display device can be sent to a client device that is receiving real-time game information from a remote terminal unit associated with the game information device linked to the image, and the real-time game information can be displayed on the stored image of the game information display device.

For example, an image of a facility's game information display device can be stored on the game server processor, the stored image can be sent to a user associated with the facility, and the real-time game information can be displayed on the image of the game information display device.

The computer instructions to create a library of team statistics 248 can instruct the game server processor to archive game statistics received from one or more remote terminal units in a library on the game server data storage.

The computer instructions to transmit video of a game information display device, video of a game, or audio of the game to one or more client devices 250 can instruct the game server processor to transmit video of the game information display device, video of a game, or audio of the game that is captured by a camera in communication with one or more remote terminal units to one or more client devices.

The computer instructions to create a library of player statistics 252 can instruct the game server processor to archive player statistics received from one or more remote terminal units. The player statistics can be archived onto the game server data storage. For example, the player statistics can be archived in a controlled access library.

The computer instructions to transmit player statistics 254 can instruct the game server processor to transmit archived player statistics to one or more client devices.

The computer instructions to allow access to one or more libraries on the data storage 265 can allow one or more client devices associated with an individual account, media account, or a facility account to access one or more libraries when a specific code is detected. The code can be automatically associated with one or more client devices upon purchase of a package, creation of an account, or can be provided to a user who can enter the code to gain access one or more of the libraries stored on the game server data storage.

The computer instructions to issue an alert of activation or deactivation of one or more remote terminal units 267 can receive a signal from the remote terminal unit that the controller of one or more associated remote terminal units has been activated or deactivated and can instruct the game server processor to transmit an alarm to one or more client devices associated with the remote terminal unit.

The computer instructions to compare game information to a preset limit and to issue an alert when the preset limit is exceeded or not achieved by acquired game information 270 can compare real-time game information to one or more preset limits stored on the data storage. The preset limits can be set by a user of an individual account, a facility account, or media account, and can send an alarm to an associated client device when the preset limit is exceeded.

For example, a user of an individual account can indicate in the individual account that the user wants to be alerted when a player for an associated facility exceeds one hundred yards rushing, and the computer instructions can instruct the processor to send an alert to one or more client devices associated with the individual account when a player associated with the facility reaches one hundred one yards rushing.

One or more of the computer instructions described herein can be included in and provided to an individual client device as a mobile device application package 275. The mobile device application package 275 can be sent to and stored on one or more personal client devices that enables the personal client devices to receive information from associated remote terminal units via the network and the game server.

FIG. 3 depicts an illustrative schematic of an illustrative media client device 300 usable with the system. The media client device 300 can be a mobile computer, a personal computer, a vehicle computer, a laptop, a smart phone, an Internet enabled mp3 player, or the like. The media client device can include a media device data storage 310 and a media device processor 312. The media device processor 312 can be in communication with the media device data storage 310.

The media client device 300 can also have a media device display area 302 and an alert device 304. The media device display area 302 can display information to a media or news organization. An alert device 304, or media alert device, can sound an alert or alarm.

The media device data storage 312 can include: computer instructions to view game information stored on the game serve data storage 320; computer instructions to link to one or more associated remote terminal units through the game server 322; computer instructions to receive alerts transmitted from the game server processor 326; and computer instructions to access one or more libraries stored on the game server data storage 328.

The computer instructions to view game information stored on the game serve data storage 320 can allow the media client device to access certain portions having stored game information. For example, these computer instructions can allow the media client device to view archived game information that is linked to the media account.

The computer instructions to link to one or more associated remote terminal units 322 can allow the media client device to link to and receive real-time game information from one or more associated remote terminal units via the game server and the network.

The computer instructions to receive alerts transmitted from the game server processor 326 can instruct the media client device to sound an alarm using the alert device 304, such as through internal speakers or as a message, when the game server processor issues an alert.

The computer instructions to access one or more libraries stored on the game server data storage 328 can integrate or embed a specific code on the media client device that is automatically transmitted to the game server that allows a media organization, news organization, or media person to access controlled access libraries on the game server data storage that are associated with the media account that is associated with the media client device.

In one or more embodiments, the media client device can include computer instructions enabling the media client device to communicate with the game server, and the game server can provide the computer instructions described in FIG. 2 as well add computer instructions 310-328 to the media client device. In one or more embodiments, the computer instruction 310-328 can be temporally stored on the media client device data storage.

FIG. 4 depicts an illustrative schematic of a personal client device 400 usable with the system.

The personal client device 400 can have a personal device display area 402 and a personal device alert device 404. The personal client device 400 can be a mobile computer, a personal computer, a vehicle computer, a laptop, a smart phone, an Internet enabled mp3 player, or the like.

The personal client device 400 can have a personal device processor 412 and a personal device data storage 410.

The personal device data storage 410 can include: computer instructions to display one or more advertisements, sponsorships, or combinations thereof on the client device 420; computer instructions to allow the client device to access one or more libraries stored on the game server data storage 422; computer instructions to communicate with the game server processor 424; computer instructions to receive alerts from the game server processor 426; and computer instructions to display real-time game information received from one or more associated remote terminal units on one or more stored images of one or more game information display devices associated with the associated remote terminal units 432.

The computer instructions to display one or more advertisements or sponsorships, or both on the client device 420 can instruct the personal client device to display one or more advertisements or sponsorships, or both sent to the personal client device from the game information server.

The computer instructions to allow the personal client device to access one or more libraries stored on the game server data storage 422 can allow the personal client device to access one or more restricted access libraries stored on the game server processor. For example, the computer instructions can have an identification code that is automatically relayed to the game server processor that will allow the personal client devices to browse one or more restricted access libraries.

The computer instructions to communicate with the game server processor 424 can provide special codes or programs that enable the personal client device to speak to the game server processor.

The computer instructions to receive alerts from the game server processor 426 can actuate the personal device alert device 404, display the alert on the personal device display area 402, or combinations thereof when one or more alerts are transmitted to the personal client devices by the game server processor.

The computer instructions to display real-time game information received from one or more associated remote terminal units on one or more stored images of one or more game information display devices associated with the associated remote terminal units 432 can transpose game information received from one or more associated remote terminal units onto one or more stored images of one or more game information display devices associated with the remote terminal units.

In one or more embodiments, the personal client device can include computer instructions enabling the personal client device to communicate with the game server, and the game server can provide the computer instructions described in FIGS. 2A and 2B as well as computer instructions 410-432 to the personal client devices. In one or more embodiments, the computer instructions 410-432 can be temporally stored on the personal device data storage.

The mobile device application package 275 can include: one or more of the computer instructions stored on the game server data storage; other computer instructions described herein, such as computer instructions 410-432; and can be stored on the personal device data storage. In one or more embodiments, the mobile device application package 275 can include computer instructions enabling the personal client device to communicate with the game server.

Figure 5:
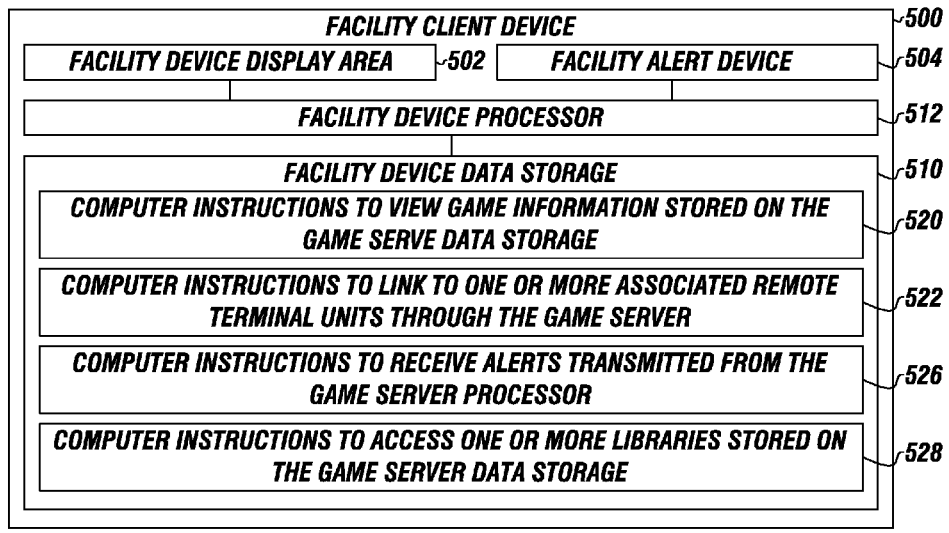
FIG. 5 depicts an embodiment of a facility client device according to one or more embodiments.

FIG. 5 depicts an embodiment of a facility client device 500 according to one or more embodiments.

The facility client device 500 can be a mobile computer, a personal computer, a vehicle computer, a laptop, a smart phone, an Internet enabled mp3 player, or the like. The facility client device 500 can include a facility device data storage 510 and a facility device processor 512. The facility device processor 512 can be in communication with the facility device data storage 510.

The facility client device 500 can also have a facility device display area 502 and facility alert device 504. The facility device display area 502 can display information to a facility or an administrator of the facility. The facility alert device 504 can sound an alert or alarm.

The facility device data storage 512 can include: computer instructions to view game information stored on the game serve data storage 520; computer instructions to link to one or more associated remote terminal units through the game server 522; computer instructions to receive alerts transmitted from the game server processor 526; and computer instructions to access one or more libraries stored on the game server data storage 528.

The computer instructions to view game information stored on the game serve data storage 520 can allow the facility client device to access certain portions, such as a the facility account, having stored game information. For example, these computer instructions can allow the facility client device to view archived game information that is linked to the facility account.

The computer instructions to link to one or more associated remote terminal units 522 can allow the facility client device to link to and receive real-time game information from one or more associated remote terminal units via the game server.

The computer instructions to receive alerts transmitted from the game server processor 526 can instruct the facility client device 500 to sound an alarm using the facility alert device 504, to display an alert on the facility device display area 502, or combinations thereof, such as through internal speakers or as a message, when the game server processor issues an alert.

The computer instructions to access one or more libraries stored on the game server data storage 528 can integrate or embed a specific code on the facility client device 500 that is automatically transmitted to the game server that allows the facility or administrator of the facility to access controlled access libraries on the game server data storage that are associated with the facility account associated with the facility client device.

In one or more embodiments, the facility client device can include computer instructions enabling the facility client device to communicate with the game server, and the game server can provide the computer instructions described in FIGS. 2A and 2B as well as computer instructions 520-528 to the facility client device. In one or more embodiments, the computer instructions 520-528 can be temporally stored on the facility device data storage.

Figure 6:
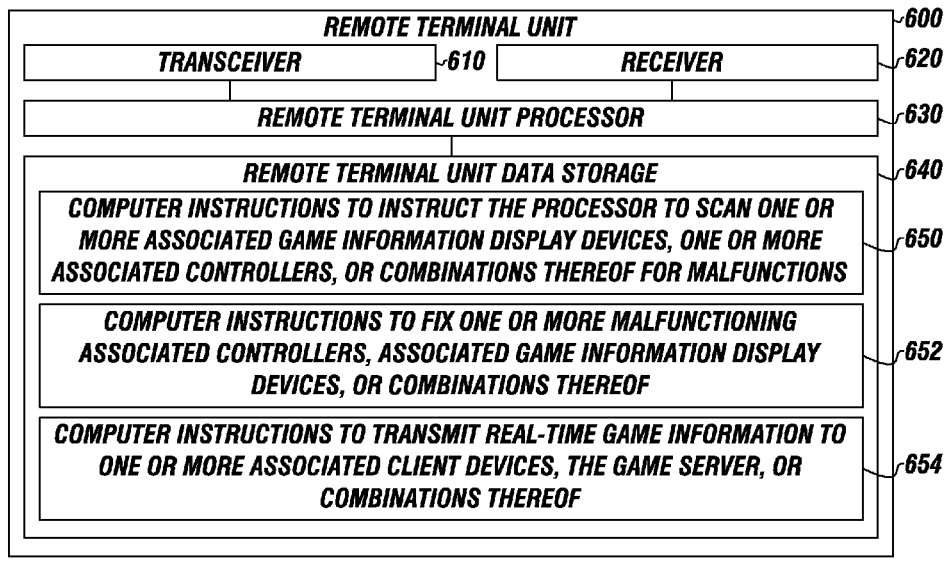
FIG. 6 depicts an embodiment of a remote terminal unit according to one or more embodiments.

FIG. 6 depicts an embodiment of a remote terminal unit 600 according to one or more embodiments. The remote terminal unit 600 can include a transceiver 610, a receiver 620, a remote terminal unit processor 630, and a remote terminal unit data storage 640.

The transceiver 610 can be in communication with the remote terminal unit processor 630 and can send signals to the game server, to an associated controller, or combinations thereof.

The receiver 620 can receive signals from an associated controller, the game server, or combinations thereof.

The remote terminal unit processor 630 can communicate with the transceiver 610 and the receiver 620 and the remote terminal unit data storage 640. The remote terminal unit processor 630 can perform functions when instructed to by one or more signals transmitted to it by the game server, one or more associated controllers, or combinations thereof.

The remote terminal unit data storage 640 can include: computer instructions to instruct the processor to scan one or more associated game information display devices, one or more associated controllers, or combinations thereof for malfunctions 650; computer instructions to fix one or more malfunctioning associated controllers, associated game information display devices, or combinations thereof 652; and computer instructions to transmit real-time game information to one or more associated client devices, the game server, or combinations thereof 654.

The computer instructions to instruct the processor to scan one or more associated game information display devices, one or more associated controllers, or combinations thereof for malfunctions 650 can instruct the processor to run a diagnostic check on one or more associated controllers, one or more associated game information display devices, or combinations thereof. For example, the processor can check to ensure that the circuits of the game information device have appropriate currents and voltages.

The computer instructions to transmit real-time game information to one or more associated client devices, the game server, or combinations thereof 654 can instruct the processor to acquire game information from one or more associated controllers and to transmit, using the transceiver, the acquired real-time game information to the game server.

In operation, a user can connect to the game server using a personal client device, such as a smart phone, enabled with Internet. The game server can provide the personal client device with computer instructions to create an individual account, such as TONY at Wellman 1988, and to associate the individual account to a facility account, such as Wellman High School in Wellman, Tex. associated with a remote terminal unit, which has a serial number such a Wellman RTU 123-085. Each remote terminal unit can have a unique number associated with a facility account. For example, a facility account can have a three digit code associated with each remote terminal unit, and each remote terminal unit can be assigned a two digit identification number.

The user or individual using the personal client device can be provided codes or other access information to obtain information from controlled access libraries on the game server. In one or more embodiments, the user can purchase one or more packaged options, and each packaged option can allow access to select game information or controlled access libraries.

For example, a gold packaged option can allow the user access to real-time game information for one activity associated with an associated facility account, and a platinum packaged option can allow the user access to real-time game information for three activities associated with an associated facility account.

When a game is going to be played and tracked using a controller in communication with a remote terminal unit associated with the facility account associated with the individual account, an alert can be sent to the personal client device associated with the individual account. As the controller is used to input data to an associated game information display device, the controller can also transmit this data to the remote terminal unit, and the remote terminal unit can send this information to the game server. The game server can then transfer received data to the personal client device associated with the individual account that is associated with the facility account associated with the remote terminal unit. This information can be displayed on the personal client device with less than ten seconds delay from when recorded by the controller.

In one or more embodiments, the user can download the mobile device application package, which can have computer instructions to enable the individual client device to view real-time game information sent from the game server, or to otherwise communicate with the game server. In one or more embodiments, the user can access the game server over the Internet, and the game server can provide computer instructions to the personal client device that allows real-time game information to be displayed on the personal client device, and to otherwise communicate with the game server processor. A combination of both of the above scenarios described in this paragraph is possible.

As used herein, when something is said to be in "communication with the game server" it can mean that it is in communication with one or more components of the game server, such as the game server processor.

As used herein "stored on the game server" can mean stored on one or more components of the game server such as the game server data storage.

While these embodiments have been described with emphasis on the embodiments, it should be understood that within the scope of the appended claims, the embodiments might be practiced other than as specifically described herein.

What is claimed is:

1. A system for transmitting real-time game information for a game to a client device, the system comprising:
   a. at least one remote terminal device adapted to be communicated with a controller associated with a game information display device, wherein the remote terminal device is configured to communicate over a network;
   b. a game server comprising a game server processor, wherein the game server processor is in communication with each remote terminal device over the network;

c. a game server data storage in communication with the game server processor, wherein the game server data storage comprises:
  (i) computer instructions for receiving game information, storing game information, transmitting game information, or a combination thereof;
  (ii) computer instructions to create at least one individual account having at least one client device identifier;
  (iii) computer instructions to allow at least one facility to create at least one facility account associated with at least one remote terminal device, wherein the computer instructions to allow a facility to create at least one facility account associated with at least one remote terminal device allows the facility to input schedules of games, wherein the games are athletic events associated with the facility;
  (iv) computer instructions to associate at least one individual account with at least one facility account;
  (v) computer instructions for identifying the controller associated with each remote terminal device associated with each facility account;
  (vi) computer instructions for determining at least one activity using each controller associated with each remote terminal device associated with each facility account;
  (vii) computer instructions to allow each individual account to select at least one activity; enabling the client device in communication with the network, to:
    receive game information from each remote terminal device via the game server; and
    store information from the game server, or combinations thereof;
  (viii) computer to validate that the game information display device is operating properly; and
  (ix) computer instructions to compile a report comprising failure information on the game information display device.

2. The system of claim 1, wherein the client device is a mobile communication device.

3. The system of claim 2, wherein the mobile communication device is a cell phone, a laptop computer, a personal computer, an Internet enabled mp3 player, an Internet enabled personal assistant device, another Internet enabled mobile device, iPad™, or combinations thereof.

4. The system of claim 1, wherein in the game server is adapted to perform a diagnostic test on: each controller of the game information display device, each game information display device, or combinations thereof.

5. The system of claim 1, wherein the game server data storage further comprises:
  a. computer instructions to store an image representing at least one game information display device, and to transmit at least one stored image representing at least one game information display to the client device; and
  b. computer instructions to display one or more advertisements on the client device when at least one stored image representing at least one game information display is transmitted to the client device, or combinations thereof.

6. The system of claim 1, wherein each remote terminal device is removable and reattachable to the controller associated with the game information display device.

7. The system of claim 1, wherein each remote terminal device is powered by the controller associated with the game information display device.

8. The system of claim 1, wherein each remote terminal device is adapted to transmit: video of the game information display device, video of a game, audio of the game, or combinations thereof.

9. The system of claim 8, wherein each remote terminal device is additionally configured to transmit or re-broadcast an RSSL from a secondary source to the client device, text information from the facility or from the secondary source to the client device.

10. The system of claim 1, wherein the game server is in communication with a plurality of game information display devices, and wherein the game server receives a plurality of real-time scoring information simultaneously.

11. The system of claim 1, further comprising a plurality of gateways each having a protocol in communication with the network.

12. The system of claim 1, wherein each remote terminal device is adapted to perform a diagnostic test on: each controller of the game information display device, each controller associated with the game information display device, or combinations thereof.

13. The system of claim 1, wherein the client device comprises a client device data
  storage with computer instructions to store game information.

14. The system of claim 8, further comprising a camera in communication with each remote terminal device for capturing video of at least the game information display device, the game or combinations thereof.

15. The system of claim 1, wherein the game information comprises: fouls, points, batting averages, strikeouts, passing yards, rushing yards, shooting percentages, receiving yards, goals scored, shots on goal, saves, injury time, escapes, take downs, time remaining, game phases, team fouls, player names, rotation switches, wins, losses, saves, field goals, points allowed, yards per rush, total team fouls, total team penalties, yards per reception, tackles, sacks, interceptions, quarterback ratings, homeruns, runs batted in, stolen bases, earned run averages, walks and hits per inning pitched, break points, player challenges, faults, first serve percentages, second serve percentages, on base percentages, slugging percentages, penalty minutes, position information, leader board information, lap time, heat or lane assignments, or combinations thereof.

16. The system of claim 1, wherein the game information display device is used for: soccer, football, basketball, baseball, volleyball, softball, ice hockey, wrestling, track and field, lacrosse, field hockey, bowling, ice skating, downhill skiing, shooting, cross country skiing, golf, swimming, diving, rugby, cricket, polo, boxing, fencing, mixed martial arts, martial arts, archery, auto racing, rodeo, horse racing, tennis, cycling, other games that have scores or statistics, or combinations thereof.

17. The system of claim 1, wherein the game server data storage further comprises: computer instructions to issue an alert of activation of at least one remote terminal device and computer instructions to issue an alert of deactivation of at least one remote terminal device, and either computer instructions to compare game information to a preset limit, computer instructions to issue an alert when the preset limit is exceeded or not achieved by the game information or both.

* * * * *